UNITED STATES PATENT OFFICE.

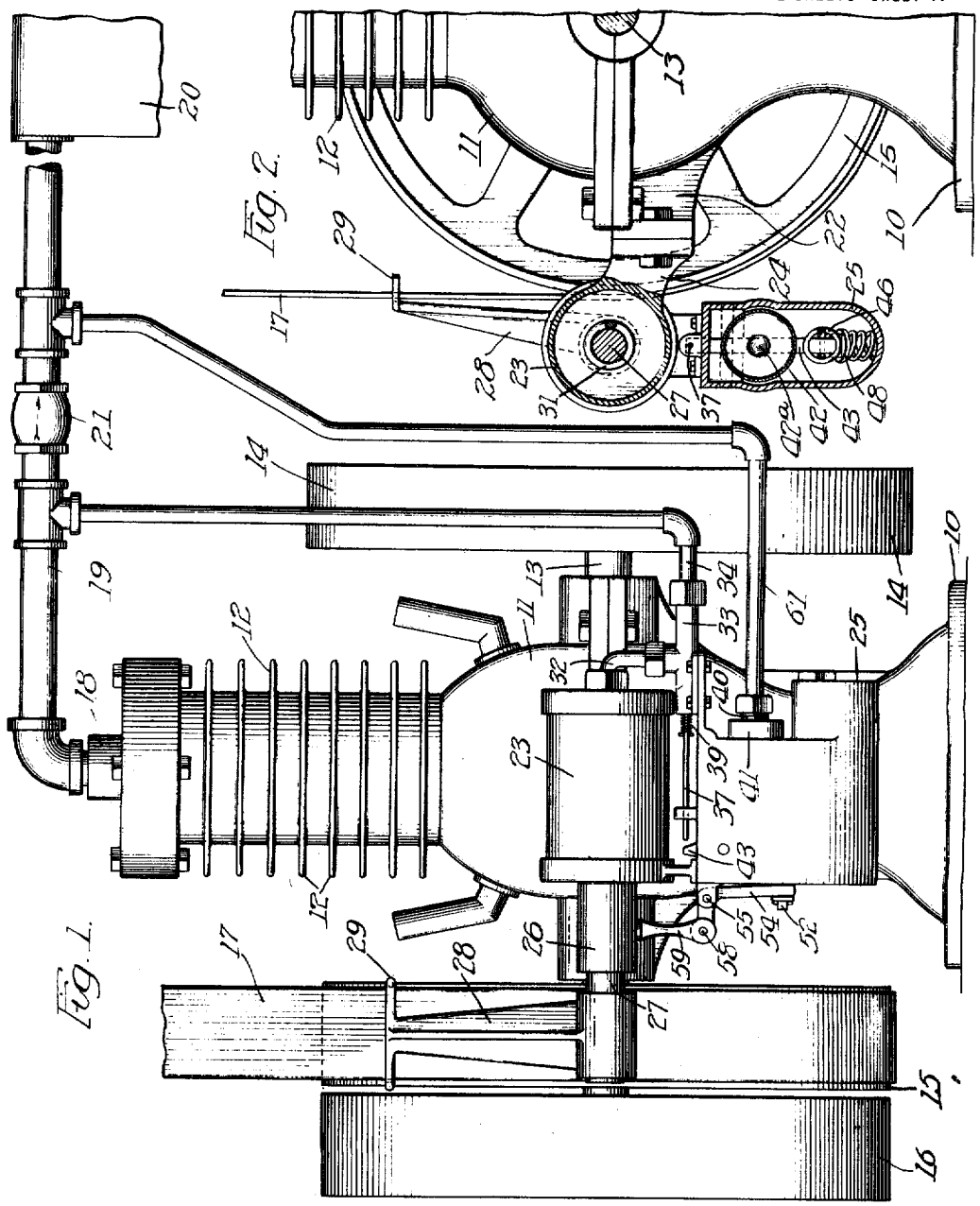

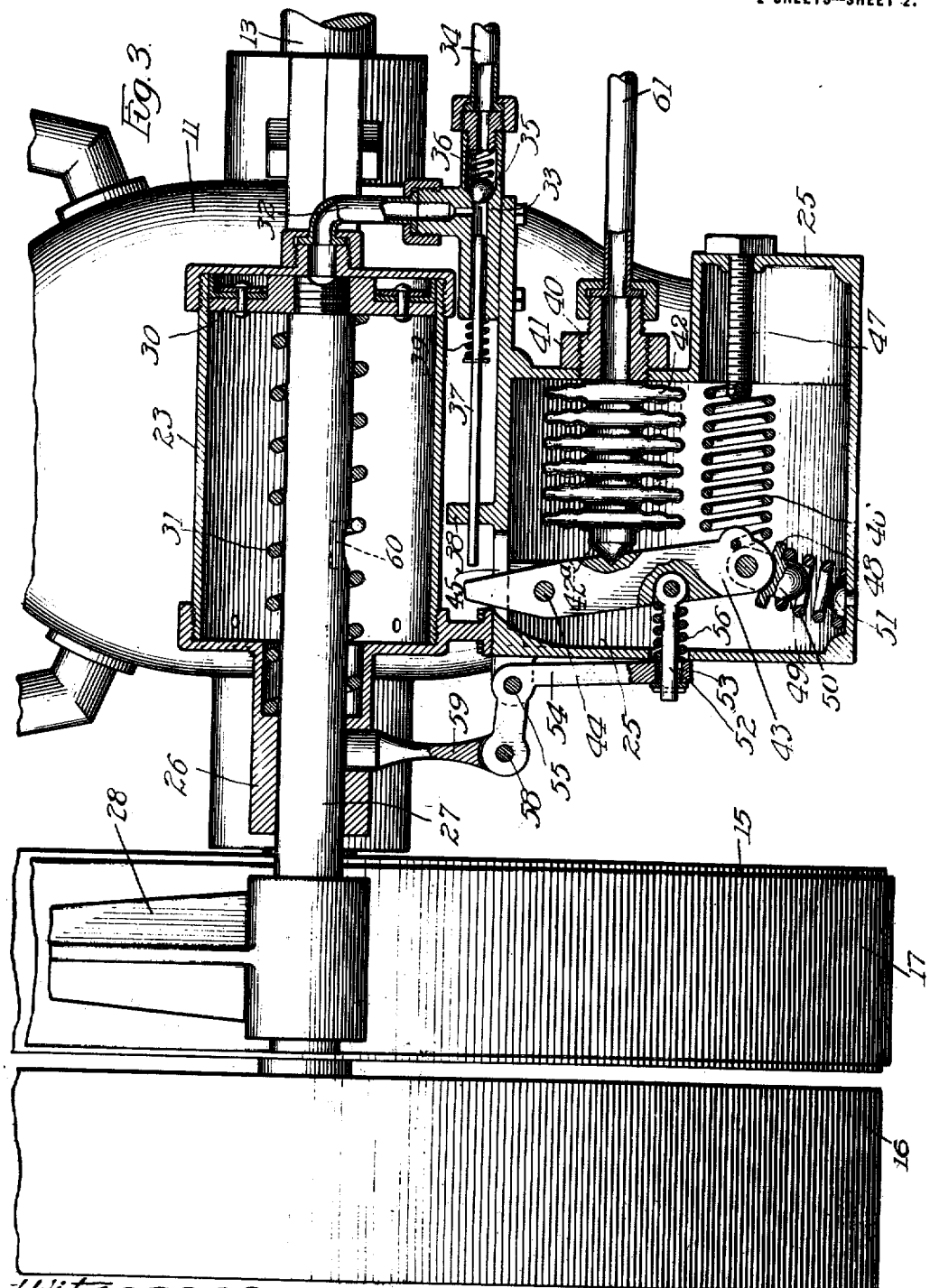

STEPHEN G. SKINNER, OF WILMETTE, ILLINOIS.

COMPRESSOR.

1,240,892.

Specification of Letters Patent.

Patented Sept. 25, 1917.

Application filed May 17, 1916. Serial No. 97,992.

*To all whom it may concern:*

Be it known that I, STEPHEN G. SKINNER, a citizen of the United States, residing at Wilmette, in the county of Cook and State of Illinois, have invented a certain new and useful Improvement in Compressors, of which the following is a full, clear, concise, and exact description, reference being had to the accompanying drawings, forming a part of this specification.

My invention relates to compressors and particularly to that class of air compressors employed in shops and garages for supplying tanks or reservoirs with air under pressure available for inflating pneumatic tires and for like purposes. It is to be understood, however, that my invention is by no means limited to this class of apparatus but may be employed in all cases where it is desirable to have a compressor or pump which automatically operates to start and stop to maintain a constant or substantially constant and available supply of air under pressure. Certain features of my invention are just as applicable to suction pumps as to compressors, as will readily be understood by those skilled in the art to which my invention relates.

My invention is particularly adaptable for use in garages and shops provided with continuously operating line shafting, and in such cases I provide the crank shaft of my compressor with fixed and loose pulleys, either one of which may be made to coöperate with a belt driven from the line shafting, it being understood, of course, that when the belt is caused to run over the loose pulley the compressor is idle, and that when the belt is caused to run over the tight pulley the compressor is caused to operate. My invention provides means for shifting the belt from the loose pulley to the tight pulley and vice versa to cause the compressor to start and stop to maintain an available supply of air at the requisite pressure. As will be hereinafter explained in detail, the means for shifting the belt is automatic in its operation, being operated and controlled by the pressure developed by the compressor.

My invention will be more clearly understood from the following description read in connection with the accompanying drawings, in which—

Figure 1 is an elevational view of a compressor equipped with the improvements of my invention.

Fig. 2 is a fragmentary view partly in section and partly in elevation, the section being taken in a plane substantially at right angles to the axis of the compressor crank shaft, and Fig. 3 is a detailed sectional view on a larger scale than the preceding views and illustrating the construction of the mechanism which operates to effect the shifting of the belt from one pulley to the other as required.

Similar characters of reference refer to similar parts throughout the several views.

In the drawings I have illustrated a compressor comprising the base 10, crank case 11 and cylinder 12. For the most part the internal construction and mode of operation of the compressor *per se* is not important in so far as my present invention is concerned. It will suffice to say that the compressor crank shaft shown at 13 is suitably connected with a piston operating within the cylinder 12 which serves to compress air within the cylinder 12 and force it therefrom in a well known manner when the crank shaft 13 is operated. Upon one end of the crank shaft 13 is provided a fly wheel 14 and upon the other end of the crank shaft are provided fixed and loose pulleys illustrated respectively at 15 and 16. The method of mounting the pulleys 15 and 16 has not been shown in detail, but it will be understood that the pulley 15 is fixed to the crank shaft 13, whereas the pulley 16, while carried by the crank shaft, is capable of rotating upon and independently of the latter. As shown in the drawings a belt 17 is passed over the fixed pulley 15 whereby the compressor crank shaft may be operated from any suitable source of power which is ordinarily in the form of line shafting (not here shown). It will be understood that the belt 17 passes over a pulley forming a part of the line shafting, and that the belt 17 may be shifted from the pulley 15 to the pulley 16, and vice versa, to cause the compressor to operate or stand idle as required.

The compressor outlet illustrated at 18 is connected by a pipe 19 with a storage tank or reservoir, diagrammatically illustrated at 20, it being understood that the tank or reservoir is arranged to contain a supply of air under pressure, the tank or reservoir being provided with suitable outlets, not shown, whereby compressed air may be drawn therefrom for the purpose of inflating automobile tires or for any other purpose. Interposed in the pipe 19 between the compressor and the tank 20 is a check valve 21, the valve member of which is arranged to open in the direction indicated by the arrow to permit the passage of air from the compressor cylinder of the tank, but arranged to prevent the return of air from the tank to the cylinder in a well known manner.

Projecting from one side of the compressor crank case and disposed in the space between the fly wheel 14 and fixed pulley 15 is a bracket 22 which serves to carry the apparatus which serves automatically to effect the shifting of the belt 17 from the fixed pulley to the loose pulley and vice versa.

The belt shifting apparatus comprises a cylinder 23, having an arm 24 attached to the bracket 22 and carried with the cylinder 23, and preferably located therebeneath is a housing 25. It will be noted that one of the heads of the cylinder 23 is provided with an outwardly projecting hollow boss 26, which provides a relatively long bearing for a shaft 27 movable with respect to the bearing 26 in a longitudinal direction, but desirably incapable of turning within the bearing. It will be understood that the shaft 27 may be rendered capable of movement in an axial direction, but incapable of rotary movement by a key and slot arrangement, or its equivalent, or by giving both the shaft 27 and its bearing 26 polygonal cross sections. Fixed upon the outer end of the shaft 27 is an arm 28 lying in the plane of one of the runs of the belt 17 and provided with fingers 29—29 arranged to lie one on each side of the belt. It will thus be understood that when the shaft 27 is in the position illustrated in the drawings the belt 17 is caused to run over the fixed pulley and thus operate the compressor, and that when the shaft 27 is moved to the left (Fig. 3) the belt is caused to run over the loose pulley and thus permits the compressor to stand idle. Fixed upon the inner end of the shaft 27 is a piston 30 provided with a suitable cup washer as shown in Fig. 3. Disposed around the shaft 27 and acting between the piston 30 and an annular shoulder formed in the hollow boss 26 is a helical expansion spring 31 which tends to hold the piston 30 and parts connected therewith in the positions shown in Fig. 3.

That end of the cylinder 23 opposite the bearing boss 26 is connected through suitable couplings and tube 32 with a valve housing 33, which is in turn connected through suitable couplings and pipe 34 with the compressor outlet pipe 19 at a point in the latter intermediate the compressor outlet port 18 and check valve 21. Disposed in the valve housing 33 is a check valve comprising the ball 35 and spring 36, and it will be understood that this check valve normally prevents communication between the compressor outlet pipe 19 and the cylinder 23 of the belt shifting apparatus. Having one end thereof loosely fitted in the valve housing 33 is a rod 37, the other end of which bears in a bracket 38 carried by or formed integral with the housing 25 as is most clearly illustrated in Fig. 3. A helical spring 39 acting between the valve housing 33 and a collar or shoulder on the rod 37 normally tend to hold the latter in the position shown in Fig. 3. It will be noticed that that end of the rod 37 nearest the ball valve 35 is reduced in cross-section, so that the rod 37 may be moved against the tension of spring 39 to unseat the ball valve 35 without at the same time preventing communication between the cylinder 23 and the compressor outlet pipe 19. I may as well explain at this point that that rod 37 has a relatively loose fit in the valve housing 33 in order that pressure within the cylinder 23 may solely leak out around the rod 37 for a purpose presently to be explained. The mechanism for shifting the rod 37 against the action of its spring 39 will also presently be explained.

Threaded into the housing 25 at the right hand side thereof (Fig. 3) is a hollow nut 40 desirably provided with a lock nut 41. The hollow nut 40 at its inner end carries and has communication with the interior of an expansible chamber 42 arranged to expand and contract as air under pressure is supplied to and released therefrom, the length of the chamber bearing a definite relation to the pressure of the fluid therein contained. The general construction of expansible chambers of this kind is now commonly known and it will suffice to say that the chamber may have the construction illustrated in Fig. 3, wherein the chamber is formed by soldering or otherwise joining a series of annular metal sections at their inner and outer edges. At its free end the expansible member thus formed is provided with a nose 42ª arranged to engage in a notch formed in the long arm of a lever 43. The lever 43 is pivoted to the housing 25 at 44 and the short arm of the lever extends upwardly through a slot 45 in the housing to a point adjacent one end of the rod 37. It will thus be seen that when air under pressure is supplied to the chamber 42 and the latter is caused to expand there is a tendency to move the lever 43 in such a direction that the short arm thereof be brought into engagement with the adjacent end of the rod 37.

The long arm of the lever 43 is connected by a helical tension spring 46 with a screw threaded into the right hand side of the housing 25 (Fig. 3) and desirably adjustable, so that the tension of the spring 46 may be regulated and determined as desired. Pivoted to the long arm of the lever 43 is a link having formed integral therewith a shoulder 48 and a boss 49. Having one end thereof disposed around the boss 49 is a helical spring 50, the other end of which is disposed around a boss 51 carried by the base of the housing 25. It will thus be seen that when the lever 43 is in the position shown in Fig. 3 the spring 50 coöperates with the spring 46 in tending to move the shorter lever arm away from the rod 37, but it will be understood that whenever the longer lever arm is moved from the position of Fig. 3 past a line extending between the pivot 44 and the boss 51 the spring 50 will oppose the action of the spring 46.

At 52 is illustrated a link having one end thereof pivoted to the long arm of the lever 43 extending through an aperture in the housing 25 and passing freely through an aperture 53 in one arm of a bell crank lever 54 pivoted to the housing 25 at 55. Acting between lever 43 and that arm of the bell crank through which the link 52 passes is a helical expansion spring 56 which normally tends to hold the bell crank lever arm in engagement with a collar or shoulder 57 carried at the outer end of the link 52. The shorter arm of the bell crank 54 is pivoted at 58 to the lower end of a latch 59, the upper end of which is guided by the bearing boss 26, and which at one stage of the operation of the mechanism is arranged to prevent longitudinal movement of the shaft 27 by engaging in a depression or notch formed in the shaft 27, as indicated at 60 in Fig. 3. It will be seen that the spring 56 at all times tends to move the latch 59 into engagement with the shaft 27, but that due to the lost motion connection between the link 52 and the bell crank the lever 43 is not prevented from moving upon expansion of the chamber 42, even though the shaft 27 be in the position illustrated in Fig. 3.

The hollow nut 40 through which communication to the expansible chamber 42 is afforded is connected through suitable couplings and a pipe 61 with the compressor outlet pipe 19 at a point intermediate the check valve 21 and the supply tank or reservoir 20. It will thus be seen that the pressure within the expansible chamber 42 is at all times substantially equal to the pressure within the supply tank or reservoir 20.

When the several parts of the mechanism are in the positions illustrated in the drawings, with the drive belt 17 passed over the fixed pulley 15, the compressor is operated to supply air under pressure to the tank or reservoir 20, the compressed air being forced through the pipe 19 past the check valve 21 in a well known manner. As the pressure within the tank or reservoir increases the chamber 42 is caused to expand, thus moving the lever 43 against the action of the springs 46 and 50. The several parts of the apparatus are so arranged that when a certain predetermined pressure has been created within the supply tank or reservoir 20, say 125 pounds, as is customary where the air is utilized for the purpose of inflating pneumatic tires, the lever 43 has been moved to such a position that the spring 50 no longer coöperates with the spring 46, but on the other hand opposes the latter and coöperates with the air pressure within the expansible chamber 42 to move the lever 43 against the action of the spring 46. When this condition is brought about the lever 43 is rather quickly snapped to such a position that the small spring 56 is placed under tension and so that the smaller arm of the lever 43 is caused to engage the rod 37 and move the latter against the action of its spring 39. When the rod 37 is moved against the action of spring 39, as just explained, the ball check valve 35 is unseated, thus establishing communication between the cylinder 23 and the pipe 19 through the pipe 34. When this condition exists air from the compressor cylinder is forced into the cylinder 23, thus causing the piston 30 to be moved against the action of spring 31. When this occurs the shaft 27 and belt shifting arm 28 are likewise operated, and the belt 17 is shifted from the fixed pulley to the loose pulley. This shifting is accomplished smoothly, so that there is no tendency to throw the belt off of the pulleys. After the belt shifting arm has been moved to such a position that the belt rides over the loose pulley the latch 59 snaps into the notch 60. The belt now passing over the loose pulley, operation of the compressor ceases, and the air in the cylinder 23 escapes around the loosely fitting rod 37 as previously explained, but the piston 30 is prevented from returning to normal position by virtue of the latch 59.

When the pressure within the tank or reservoir 20 drops below a predetermined pressure the pressure exerted upon the lever 43 will be so slight that the spring 46 is enabled to move the lever 43 to the position shown in Fig. 3, it being understood that the spring 50 coöperates to assist the spring 46 at the last part of the movement of the lever 43. When the lever 43 is thus retracted under the action of the spring 46 and with the assistance of the spring 50 as just explained the collar or shoulder at the free end of the link 52 takes against the longer arm of the bell crank 54 and operates the latter to disengage the latch 59 from the notch 60 of the shaft 27. The shaft 27 being then free to move under the action of the spring 31, the piston 30 is moved toward the right (Fig. 3), thus carrying the shaft 27 and belt shifting arm 28 in the same direction and shifting the belt onto the tight pulley. Pressure behind the piston 30 is permitted to escape slowly around the rod 37, as previously explained, and it will thus be understood that the shifting from the loose to the tight pulley is accomplished smoothly. After the belt has been again shifted to the tight pulley as just explained the compressor again operates to supply the tank 20 with compressed air, and after the pressure within the tank has again exceeded a predetermined value the mechanism again operates to shift the belt from the tight pulley to the loose pulley, as previously explained.

It will be understood that the springs forming a part of the controlling mechanism may be so adjusted that the belt will be shifted from the tight pulley to the loose pulley when a certain pressure is attained within the reservoir, say, 125 pounds, and the belt shifted from the loose to the tight pulley when the pressure has dropped to, say, 100 pounds, thus leaving a certain range within which the tank pressure may vary without any operation of the compressor.

Having thus described my invention, what I claim as new and desire to secure by Letters Patent of the United States, is:

1. In combination with a compressor, driving mechanism therefor comprising tight and loose pulleys and a belt, a tank supplied from the compressor, a belt shifting mechanism comprising a cylinder and piston in the cylinder, means connected with the piston arranged to engage and shift the belt, fluid pressure operated means controlled by tank pressure arranged to admit pressure to said cylinder to operate the piston and belt shifting mechanism when the tank pressure exceeds a certain limit, a locking device arranged positively to hold the piston against movement in the opposite direction when said piston reaches the end of its stroke which carries the belt to the loose pulley, and mechanism controlled by the fluid pressure operated means aforesaid, for releasing the piston from the locking device when the tank pressure falls below a certain predetermined minimum.

2. In combination with a compressor, driving mechanism therefor comprising tight and loose pulleys and a belt, a tank supplied from a compressor, a belt shifting mechanism comprising a cylinder, a piston in the cylinder, means connected with the piston arranged to engage the belt to shift the latter from the tight to the loose pulley and vice versa, spring means tending to hold the piston in a certain position, fluid pressure operated means controlled by the tank pressure arranged to admit pressure to said cylinder to move the piston in opposition to said spring, to shift the belt from the tight to the loose pulley when the tank pressure exceeds a certain predetermined maximum, a locking member arranged positively to hold the piston against movement under the action of said spring means when the piston has reached the end of its movement in opposition to said spring, and mechanism operated by the aforesaid fluid pressure operated means for releasing the piston from said locking member when the tank pressure falls below a certain predetermined maximum.

In witness whereof, I hereunto subscribe my name this 11th day of May, A. D. 1916.

STEPHEN G. SKINNER.

Witnesses:
A. G. McCaleb,
F. F. Andersen.